United States Patent [19]

Renshaw et al.

[11] Patent Number: 4,882,588

[45] Date of Patent: Nov. 21, 1989

[54] STEERABLE BEAM ANTENNA SYSTEM USING BUTLER MATRIX

[75] Inventors: Kenneth H. Renshaw, Manhattan Beach; Timothy A. Murphy, Redondo Beach, both of Calif.

[73] Assignee: Hughes Aircraft Company, Los Angeles, Calif.

[21] Appl. No.: 271,401

[22] Filed: Nov. 14, 1988

Related U.S. Application Data

[63] Continuation of Ser. No. 944,091, Dec. 22, 1986, abandoned.

[51] Int. Cl.$^4$ .......................... H01Q 3/22; H01Q 3/24; H01Q 3/26
[52] U.S. Cl. ...................................... 342/373; 342/354
[58] Field of Search ......................... 342/373, 375, 354

[56] References Cited

U.S. PATENT DOCUMENTS

| | | | |
|---|---|---|---|
| 3,135,917 | 6/1964 | Best et al. | 342/375 |
| 4,503,434 | 3/1985 | Luh | 342/373 |
| 4,595,929 | 6/1986 | Kreutel, Jr. | 342/373 |
| 4,652,879 | 3/1987 | Rudish et al. | 342/373 |

OTHER PUBLICATIONS

National Telecommunications Conference, NTC-1980, 30 Nov.–4 Dec., Conference Record, vol. 1 of 4, IEEE (Houston, Texas), P. R. Hirschler-Marchand et al.: "System Design and Technology Development for an EHF Beam-Hopped Satellite Downlink", pp. 17.5.1–17.5.7.

J. P. Shelton and K. S. Kelleher, "Multiple Beams from Linear Arrays", IRE Transactions on Antennas and Propagation, vol. AP-9, No. 2, pp. 154–161, (Mar. 1961).

W. P. Delaney, "An RF Multiple Beam Forming Technique", MIT Lincoln Labs Report, Armed Services Technical Information Agency AD 262017, Aug. 9, 1961.

M. Ueno, "A Systematic Design Formulation for Bulter Matrix Applied FFT Algorithm", IEEE Trans. Antennas and Propagation, vol. AP-29, pp. No. 3, May 1981.

C. Dragone & M. Gans, "Imaging Reflector Arrangements to Form a Scanning Beam Using a Small Array", Bell System Technical Journal, vol. 58, No. 2, pp. 501–515 (Feb. 1979).

Primary Examiner—Theodore M. Blum
Attorney, Agent, or Firm—Steven M. Mitchell; Wanda Denson-Low

[57] ABSTRACT

A steerable beam antenna system for use in satellite communication systems and including a main reflector and an antenna array having a plurality of feed elements is disclosed. The antenna array is positionable at or near at least one focal point of the main reflector, and its feed elements can receive microwaves from or transmit microwaves toward the main reflector. A Butler matrix having multiple input ports and multiple outputs is connected to the array of feed elements and substantially performs a spatial Fourier transformation on a generated set of signals to be transmitted which have a predetermined phase relationship between the signals, which is necessary to create the steerable beam. The Butler matrix also can perform an inverse spatial transformation on a set of incoming signals focused on the array by the reflector and received by the feed elements. By using a Butler matrix, the antenna system of the present invention is able to communicate with multiple ground stations simultaneously and with high gain using many virtual spot beams, each oriented to a distinct location on the earth that is dependent on the relative frequency of the beam.

29 Claims, 7 Drawing Sheets

STEERABLE BEAM ANTENNA SYSTEM USING BUTLER MATRIX

This application is a continuation of application Ser. No. 06/944,091, filed Dec. 22, 1986, now abandon.

BACKGROUND OF THE INVENTION

1. Field of the Invention

This invention relates to an antenna for satellites to communicate with ground stations and, more particularly, to an antenna system for satellites incorporating an antenna array and a Butler matrix for producing a communicating beam steerable by varying a carrier frequency of the beam.

2. Description of the Related Art

Satellites are now employed for providing communication, such as telephone in land mobile service, between distant points on the surface of the earth. One embodiment of such a system is of considerable interest, namely, an embodiment wherein the satellite travels in a geostationary orbit about the earth. For example, the satellite may be located at a fixed position above the United States. The satellite would carry an antenna having a sufficient beam width in the north-south direction and in the east-west direction to permit the reception and transmission of communication signals between any two points in the United States. The beam width in the north-south direction can be enlarged to include both United States and Canada, if desired. A beam width of approximately 4.5° in the north-south direction is sufficient to cover both Canada and the United States. The beam width in the east-west direction should be approximately 8° to provide the desired coverage. A problem arises in that the use of an antenna having the foregoing beam width in the north-south and east-west directions has less signal gain than is desired. This necessitates larger power amplifiers for driving radiating elements of the antenna.

In previous satellite communication systems, such a wide beam width antenna has employed at least two overlapping beams to provide the coverage. The generation of such beams with a desired overlap until very recently required the use of separate large reflectors each having a diameter of about 16 feet. In the construction of communication satellites, however, it is desirable to reduce physical sizes, weights, and power requirements to facilitate the construction and launching of such satellites.

In commonly assigned, copending U.S. patent application Ser. No. 782,770 filed Oct. 1, 1985 in the name of H. A. Rosen and entitled STEERED-BEAM SATELLITE COMMUNICATION SYSTEM, which is hereby incorporated by reference, there is disclosed a system for communicating via satellite between ground stations. The system comprises a set of ground stations spaced apart along an arc of the earth's surface and a satellite positioned above the earth in view of the arc. An array of radiating elements is deployed on the satellite, and a frequency responsive beam former connected to the radiating elements is provided for forming a beam of electromagnetic radiation. The beam is steerable in response to a carrier frequency of the radiation to intercept individual ones of the stations in seriatim. The frequencies of an up-link carrier and of a down-link carrier respectively associated with respective ones of the ground stations vary monotonically with position along the arc to permit automatic positioning of a beam from the satellite to a ground stations upon energization of a carrier frequency assigned to the ground station.

So that the present invention may be better understood, the satellite communication system disclosed and claimed in the aforementioned application will now be discussed in some detail by reference to FIGS. 1 through 5. As shown in FIGS. 1 and 2, the satellite 24 employs a simplified antenna structure 30 comprised of two confocal parabolic reflectors, one of which is a large main reflector 32 and one of which is a small subreflector 34, and a 4×2 array 40 of eight radiating elements 42, all of which are supported by a frame 44. A front view of the array 40 is shown in FIG. 2. The array 40 of radiators 42 is rigidly secured in front of the subreflector 34, and with the subreflector is located within the satellite 24. The main reflector 32 is substantially larger than the subreflector 34, and due to the larger size, is folded during launch, and is subsequently unfurled when the satellite or spacecraft 24 has been placed in orbit. Upon being unfurled it extends outside of the satellite 24 as shown. Also shown in FIG. 1 within the frame 44 is other spacecraft equipment such as rocket engines and fuel tanks, thereby to demonstrate that the antenna system 30 can be easily carried by the satellite 24.

The arrangement of the components of the antenna system 30 provides a significant reduction in weight and complexity for a satellite antenna over that which has been employed before. This is accomplished by fabricating the main reflector 32 and the subreflector 34 with parabolic reflecting surfaces, the two surfaces being oriented as a set of confocal parabolas having a common focal plane or point 48. Such configuration of reflecting surfaces in an antenna is described in C. Dragone and M. Gans, "Imaging Reflector Arrangements to Form a Scanning Beam Using a Small Array", *Bell System Technical Journal*, Vol. 58, No. 2, (Feb. 1979), pp. 501–515. The configuration provides a magnification of the effective aperture of an array of radiating elements. In the preferred configurations as shown in FIGS. 1 and 2, the magnification factor is 4.7. The eight radiating elements 42 of the array 40 represent a substantial reduction in complexity of the antenna since, if a direct radiator of similar sized elements had been employed, a total of 155 radiating elements would have been needed to give the same antenna performance. As shown in FIG. 3, a hexagonally arranged antenna array 50 of seven primary radiators 52 may be used if desired in place of the 4×2 array of radiators mentioned above. The array 50 of feed elements 52 may be employed for both up-link and down-link communications.

FIG. 4 illustrates two exemplary spot beams 56, 58 produced by the satellite 24 (not shown in FIG. 4) in geosynchronous orbit above the earth 60. Spot beam 56 extends substantially along the eastern coast of the United States 62 and Canada 64, while spot beam 58 extends substantially along the western coast of the United States 62 and Canada 64. The satellite transmits and receives information-carrying radiation to and from ground stations located within regions of the earth's surface encompassed by the respective first and second spot beams 56, 58. The coverage patterns of the respective spot beams 56, 58 preferably are selected such that frequency bands available for communications are concentrated in regions of the surface of the earth 60 where the largest communications capacity is necessary, to optimize antenna gain usage by substantially limiting the amount of antenna gain which is incident upon regions wherein relatively little communications capacity is necessary, such as in sparsely populated regions.

The antenna system of satellite 24 provides a one-dimensional beam scan (which may be considered to be a continuum of virtual spot beams) across the surface of the earth 60. Such a scan can be directed along an arc of the earth's surface such as a longitudinal or a latitude, or an arc included relative to a latitude. The scanning can be accomplished most efficiently for the geography depicted in FIG. 4 by scanning in the east-west direction providing a scan path which follows an arc of a great circle of the earth. The scanning is preferably emplemented by using fixed delays (as will be described hereinafter) among radiating elements of the antenna system and by employing different frequencies for different geographical locations on the surface of the earth. Thereby, the scanning is accomplished by variation of the frequency of the radiation for each position of the beam can (i.e., for each virtual beam), and in addition, a plurality (not shown) of the beams can be generated simultaneously by the provision of different frequencies of electromagnetic radiation in each of the beams. By use of this virtual beam technicque, users at any point within the coverage of the beam scan are close to the center of one of the virtual beams. Therefore, users will typically receive 2 or 3 dB more power than they would from a comparable satellite using fixed beams.

To minimize the required electromagnetic power and provide for simplicity of antenna structure, the preferred antenna system provides beams with a generally circular cross section and a width of 4.5°, by use of the hexagonal array 50 of radiating elements 52 as shown in FIG. 3. The elements 52 preferably are cup dipole feed horns one wavelength in diameter.

As an example of its use, the satellite communications system may be designated for land mobile telephone service, sometimes referred to as the Mobile Satellite (MSAT) system. Two frequency bands are assigned for such service: 866–870 MHz for the down-link band and 821–825 MHz for the up-link band. The 4 MHz width of each of these bands may be subdivided into approximately 1000 frequency slots which are individually assignable to individual ground stations on the surface of the earth 60 for companded single sideband voice communication. If the stations were uniformly positioned from east to west, with each station being at a different longitude, approximately twelve assignable channels comprising an up-link and a down-link would be available within a scan angle of approximately 0.1 degree.

Since the channels would be uniformly spaced apart in frequency, a beam would be uniformly stepped in the east-west direction as the down-link (or up-link) frequency was shifted from one channel to the next channel. In other words, the operating frequency of the ground station is preferably selected to match the frequency of a beam directed from the satellite to the ground station. For a uniform distribution of the stations in the east-west direction, the beam could be centered with respect to the east-west component thereof, upon each of the stations. However, as a practical matter, the stations tend to be clustered in various geographic areas of the United States 62 and Canada 64 providing a nonuniform distribution of the stations along the east-west scanning path of the beam. Consequently, a peak signal amplitude cannot be obtained for all of the stations.

By way of example, assuming that 25 ground stations are located within a scan angle of 0.1°, the corresponding reduction from peak signal amplitude is less than 0.01 dB (decibels). This represents a significant improvement over previously available satellite communication systems employing separate fixed beams wherein the average loss in signal gain relative to peak signal gain in the east-west direction was approximately 0.8 dB. As noted above, such previous satellite communication systems employed antenna systems having a plurality of large antenna reflectors, measuring approximately 16 feet in diameter, while the antenna system described in the aforementioned patent application requires only one such large reflector and a much smaller confocal subreflector as will be described hereinafter. Thus, the disclosed system provides for improved uniformity of signal gain with a simplified mechanical structure of the antenna system.

FIG. 5 presents a diagram useful in explaining the frequency scanning operation of the antenna system. A set of four radiating elements 42 are arranged side by side along a straight line, and face an outgoing wavefront 66 of electromagnetic radiation. The angle of incidence of the wavefront or beam scan angle is measured relative to a normal 68 to the array 40 of elements 42. A frequency scan is generated in a planar array antenna by introduction of a progressive time delay into the array. The progressive time delay provides for a difference in the phases of signals excited by adjacent ones of the elements 42 such that the phase difference is proportional to the frequency of the radiated signals. This explanation of the operation assumes an outgoing wavefront, it being understood that the operationg of the array of elements 42 is reciprocal so that the explanation applies equally well to an incoming wavefront. The relationship of scan angle to frequency, element spacing, and time delay is given by the following equations:

$$2\pi D \sin \theta = \Delta \Psi = 2\pi f \Delta T \tag{1}$$

therefore, $$\sin \theta = \lambda / D f \Delta T \tag{2}$$

wherein:
D = spacing between elements,
$\theta$ = beam scan angle,
$\lambda$ = wavelength of radiation,
$\Delta \Psi$ = phase increment between adjacent elements,
f = frequency relative to band center, and
$\Delta T$ = time delay increment between adjacent elements.

The radiating elements 42 are energized via a source 70 of microwave energy and a series of delay units 72 coupled to the source 70. Each of the delay units 72 provides the time delay increment referred to above in Equations (1) and (2). The source 70 is connected directly to an element 42 at the left side of the arry while the next element 42 is connected by one of the delay units 72 to the source 70. The signals applied by the source 70 to the third and the fourth of the elements 42 are delayed, respectively, by two and three delay increments of the delay units 72. This provides the linear phase relationship to provide the scan angle for the outgoing wavefront 66. The phase increment between two adjacent ones of the radiators 42 is proportional to the product of the frequency of the radiation and the delay increment. When this product is equal to 360°, the wavefront propagates in a direction normal to the array of elements 42. Increasing values of frequency produce greater phase shift to direct the wavefront to the right of the normal 68 as shown in FIG. 5, while decreasing amounts of frequency produce less phase shift and drive the wavefront to the left of the normal. Accordingly, the wavefront can be scanned symmetrically about the array of elements 42.

The aforementioned application also discloses that for the case of the foregoing up-link and down-link frequency bands, and for the case of the radiating elements 42 having a diameter of approximately one wavelength, a suitable value of differential delay, as provided by the delay units 72 of FIG. 5 is 185 nanoseconds for the case of substantially uniform distribution of ground stations on the surface of the earth 60. To provide the east-west coverage of 8°, the up-link and the down-link beams are scanned through an arc from −4° to +4°. In view of the magnification factor of 4.7, the scan angle of the array 40 of radiating elements 42 must be enlarged by the same magnifying factor, 4.7, from that of the output scan from the main reflector 32. Therefore, the beam produced by the radiating elements 42 must be scanned through an arc of 18.8° to either side of a normal to the array 40. The foregoing value of differential delay, namely, 185 nanoseconds, provides the 18.8° scan to either side of the normal to the array 40. In th ideal situation of uniformly distributed ground stations between the East Coast and the West Coast of the United States and Canada, the number of channels per degree has a constant value of 1000/8=125.

In the situation wherein the differential delays provided by the delay units 72 are independent of frequency, then an optimal direction of the scanned beam is obtained for the ideal situation of uniform distribution of ground stations. In the more likely situation of a nonuniform distribution of ground stations, the scanned beam may be displaced slightly from its designated ground station. As has been noted above, such a beam-pointed inaccuracy reduces the signal level by less than 0.01 decibels for a beam-pointing error of 0.1 degree.

The aforementioned patent application discloses that the scanning can be adapted to accommodate the foregoing nonuniformity in ground-station distribution by introducing a frequency responsive component to the differential delay. It gives an example of nonuniform distribution where the differential delay between columns of the array 40 of radiating elements 42 (see FIG. 4) should vary, at least for the forming of the down-link beams, between 262 nanoseconds at the low frequency end of the transmission band to 131 nanoseconds in the high frequency end of the transmission band. Other values of delay may be employed in the beam forming operation of up-link beams provided by the receiver of the antenna system (30).

The values of delay used in the different frequency bands, namely, the up-link and down-link frequency bands, are inversely proportional to the center frequencies of these bands as is apparent from Equations (1) and (2). A reduction in the differential delay results in a reduced amount of phase shift between successive beams with a corresponding reduction in displacement of beam position on the surface of the earth 60 from one channel to the next channel. Thereby, the beam can be more accurately positioned in a region of high density of ground stations. In a corresponding fashion, an increase in the differential delay results in increased movement of the beam as the frequency is shifted from one channel to the next channel, thus accommodating positions of the beam to a less dense distribution of ground stations. The channel number corresponds to a specific frequency in either the up-link or th down-link band. With respect to the positioning of ground stations along an arc of a great circle of the earth 60, as disclosed with reference to FIG. 4, it is seen that the frequencies selected for the various stations vary monotonically with position along the foregoing arc.

In view of the foregoing description, it is seen that the above described communication system provides two-way communications between ground stations and a geosynchronous satellite. The assignment of specific frequencies to respective ones of the ground stations, in combination with frequency scanning of both up-link and down-link beams of the satellite (24), permits a simplification in the circuitry of the system. In addition, the use of the two confocal parabolic reflectors provides a multiplicative factor which reduces the number of elements required in the array of radiating elements. The use of a scanned beam also reduces the physical size of the antenna system by reducing the number of reflectors, resulting in a lighter weight, more efficient satellite communications system.

It has been found that certain technical impediments exist to the commercial implementation of the above described confocal reflector system. Due to spacecraft size limitations the subreflector 34 cannot be constructed large enough (in terms of wavelengths) to perform with acceptable efficiency. These size limitations also restrict the size of the main reflector and the focal lengths that may be used in the confocal arrangement.

It would be desirable, in order to achieve a further weight-saving and simplification of the aforementioned satellite communications system, to eliminate the subreflector altogether while still utilizing a relatively low number of radiating elements. It would also be very advantageous to be able to combine the power of output signals from several individual amplifiers operated in parallel into an individual one or small group of the radiating elements so as to produce a stronger spot beam in any given location along the area of the earth being swept by the scanning beam. It would further be desirable to use as many elements as possible as common elements in an antenna system for the transmitter antenna system and receiver antenna system of a communications satellite so as to save weight, space and cost. The present invention is directed to achieving these and other desirable objects.

SUMMARY OF THE INVENTION

In light of the foregoing objects, there is provided in one embodiment of the present invention an improved antenna system including a reflector having at least one focal point associated therewith, and an antenna array having a plurality of feed elements. The improvement in the antenna system comprises in combination: means, operatively connected to said antenna array, for at least approximately performing a spatial transformation on the amplitude and phase distribution of input signals provided thereto, and wherein the antenna array and the reflector are positionable relative to one another such that the feed elements are operatively disposed near the focal point of the reflector when the reflector is in its intended operating position. The spatial transformation which is performed is selected from the group of transformations consisting of Fourier transforms and inverse Fourier transforms. The transformation performing means includes a Butler matrix having a plurality of input ports and a plurality of output ports. The antenna array and the Butler matrix are preferably used for both transmission and reception of signals. When the antenna system is used for reception, the input signals provided to the spatial transformation means are signals obtained from electromagnetic radiation focused by the reflector onto the antenna array for reception by the feed elements, and the spatial transformation is an inverse Fourier transform. When the system is used for transmission, the spatial transformation means produces signals provided to the antenna array, and the spatial transformation is a Fourier transform. When used as a transmitter, the system preferably further comprises means for feeding the input ports of the Butler matrix with a set of signals having a predetermined phase relation from input port of input port.

The antenna systems of the present invention are preferably used in a satellite for communications with ground stations. In such an application, the system typically is further comprised of a satellite frame to which the reflector and antenna array are attached. The reflector and antenna array should be operatively arranged with respect to one another to enable an steerable beam produced by electromagnetic radiation eminating from said array to be reflected off the reflector when the reflector is in its intended operating position.

Another aspect of the present invention is a method of operating a steerable beam antenna system comprising the steps of: (a) providing a set of first signals having a predetermined phase relationship with respect to one another and containing information to be transmitted; (b) generating a set of signals from said set of first signals by at least approximately performing a spatial transformation on the amplitude and distribution of said set of first signals; and (c) transmitting said set of second signals toward a reflector by passing said second signals through a plurality of radiating elements located near at least one focal point of the reflector. The method may further comprise the step of: (d) providing a Butler matrix in order to generate said set of second signals from said set of first signals, and wherein said spatial transformation is a Fourier transform.

The method is preferably used in satellite communications systems for communicating with multiple grounds stations through the use of steerable beam associated with the antenna system. In such applications the reflector is a main reflector and is mounted on the satellite.

One other aspect of the present invention provides an improved steerable beam antenna system having a reflector, an antenna array provided with a plurality of radiating elements for generating electromagnetic radiation which is reflected off of said reflector and constitutes a steerable beam, and a plurality of power amplifiers for generating output signals simultaneously in parallel which are provided to the plurality of radiating elements. The improvement in this embodiment of the present invention comprises in combination: means, operatively disposed between the amplifiers and the plurality of radiating elements, for distributing the output signals to the plurality of radiating elements in a predetermined manner based upon a relative frequency associated with the output signals, whereby the power of the output signals is effectively combined. The transformation performing means of this antenna system preferably includes a Butler matrix. The system is most economically configured with only one reflector, and the plurality of radiator elements in this configuration is located substantially at the focal point of the reflector.

These and other aspects, objects, features and advantages of the present invention will be more fully understood from the following detailed description and appended claims, taken in conjunction with the drawings.

DETAILED DESCRIPTION OF THE PREFERRED EMBODIMENTS

The present invention comprises a novel antenna system for communicating with multiple ground stations typically distributed over a large geographical area of the earth. The following description is presented in conjunction with the technical description set forth above, to enable any person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 6:
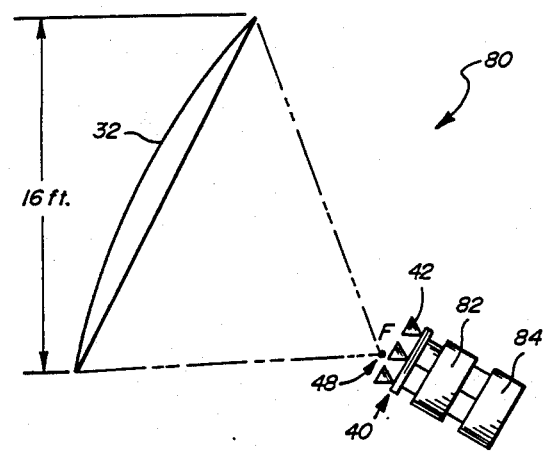
FIG. 6 is simplified diagrammatic representation of an antenna system of the present invention usable in a satellite.

As shown in FIG. 6, the antenna system 80 of the present invention includes a main reflector 32 and an array 40 (or 50) of radiators 42 (or 52) of the type described in FIGS. 1 through 5 above. The antenna system 80 is preferably located on satellite 24 by being mounted on a suitable frame 44. In the antenna system 80 of the present invention, the subreflector 34 (shown in FIGS. 1 and 3) is removed and the array 40 (or 50) of primary radiators 42 (or 52) or feed horns is placed at (or near) the focal point or plane 48 of the offset feed reflector 32. The array 40 (or 50) is fed by a Butler matrix 82, which is arranged "backwards" with respect to the traditional use of this type of beam forming matrix. Connected to the matrix 82 are the transmitter and receiver networks, represented by block 84. The use of a Butler matrix in this manner produces an excitation sequence for the antenna system 80 which is the spatial Fourier transform of the excitation sequence input to the beam forming array of primary radiators in the antenna system 30 of FIGS. 1 through 5. In this way, the far field pattern produced by the array and signal reflector is identical (in the ideal case) to that of the previously described confocal arrangement. There will be some difference in the non-ideal case due to the effects of spatial sampling and the physical limitations on the size of the array that may be placed at the focal point.

Figure 3:
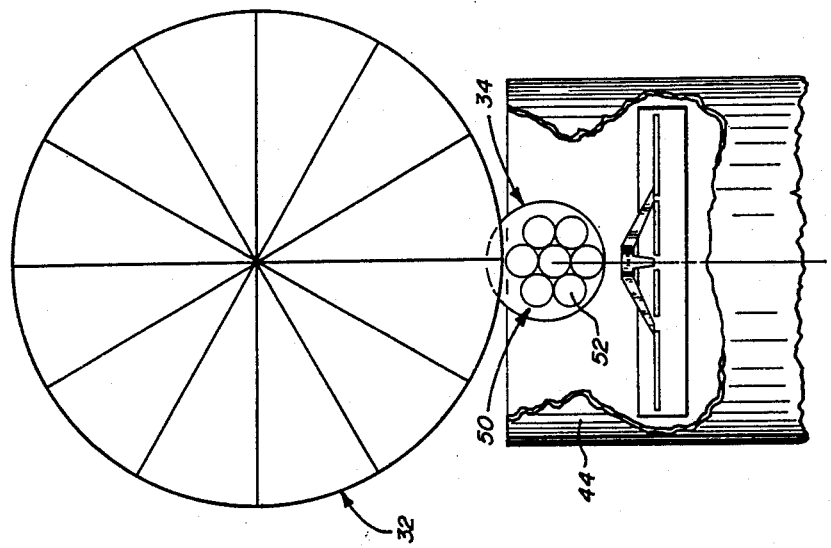
FIG. 3 is a front elevational view of the antenna subsystems shown in FIG. 1, which employes an alternative hexagonal arrangement of radiators.
Figure 2:
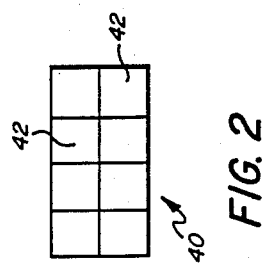
FIG. 2 is a front view of the rectangular array of radiators in the FIG. 1 satellite.
Figure 1:
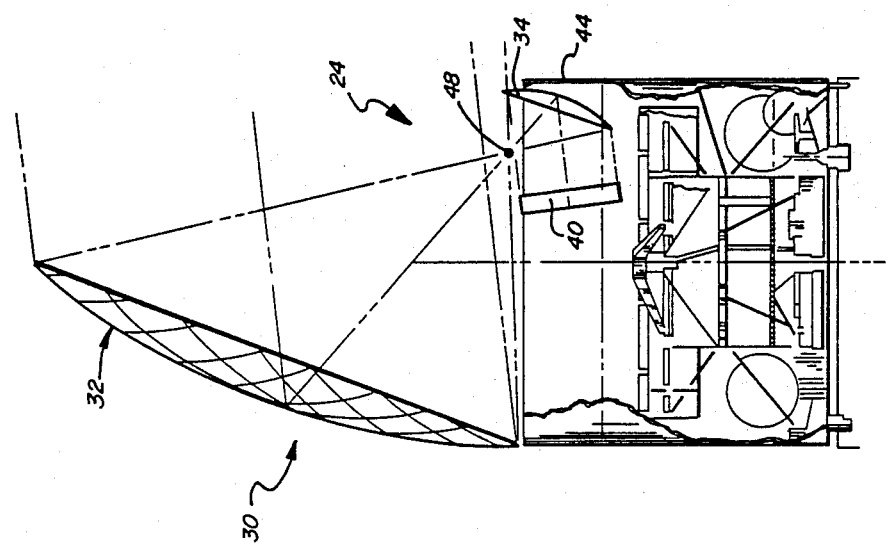
FIG. 1 is a side elevational view of a communications satellite, showing an array of radiators, an imaging reflector and primary reflector.
Figure 4:
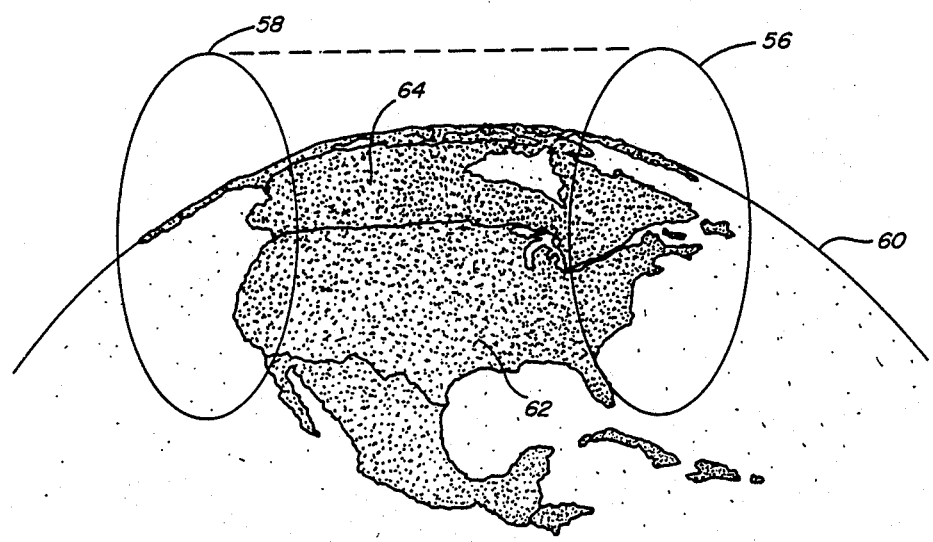
FIG. 4 is a stylized pictorial view of spot beams formed on the surface of the earth using the FIG. 1 satellite.
Figure 5:
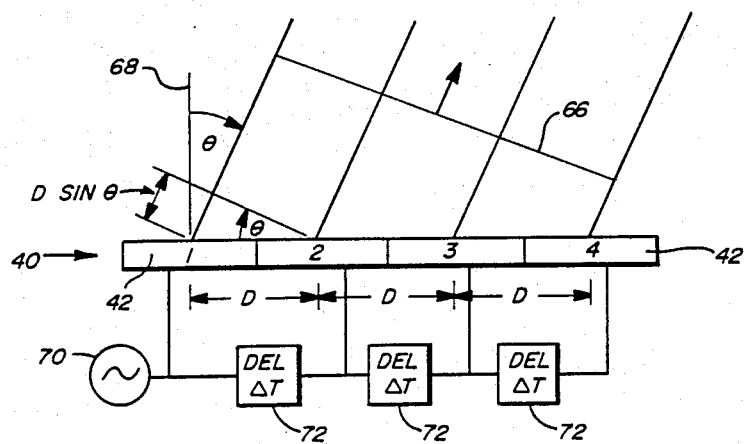
FIG. 5 is a diagram showing a relationship between an outgoing wavefront and the elements of a line array of radiators.
Figure 7:
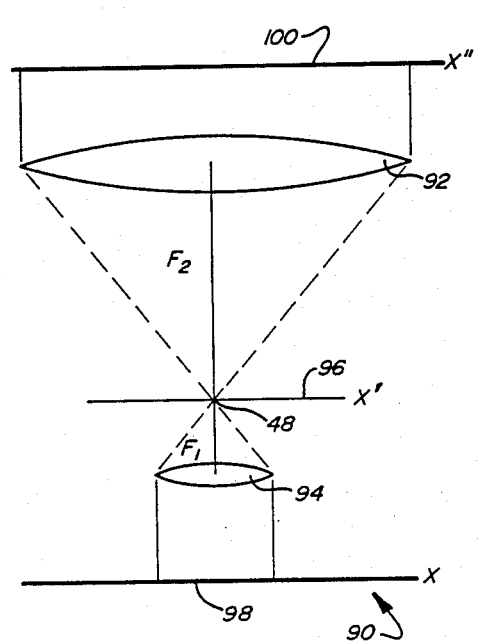
FIG. 7 is an optical diagram showing a dual lens system.

The operation of the antenna system 80 shown in FIG. 6 and the foregoing explanation of same may be better understood by considering the equivalent optical model of the conformal reflector configurations, shown in FIGS. 1 and 3 previously described above. FIG. 7 shows the equivalent optical model 90 of this earlier antenna system 30 employing two lenses 92 and 94, which correspond in function to the main reflector 32 and the subreflector 34 respectively. The focal plane x' represented by line 96 includes the focal point 48. The focal length of lens 92 is $F_2$, while the focal length of lens 94 is $F_1$. The magnification factor M of the system 90 in FIG. 7 is given by:

$$M = F_2/F_1 \quad (3).$$

An amplitude and phase distribution of an image, F(x), at the image plane x represent by line 98 is magnified by lenses 92 and 94 such that at the magnified image plane x" represented by line 100

$$f(x'') = f(M x) \quad (4).$$

From optical theory, it is well known that the amplitude and phase distribution at the focal plane x' is the spatial Fourier transform of the amplitude and phase distribution at the image plane x. That is to say:

$$f(x') = F[f(x)] \quad (5).$$

By removing the first lens and producing f(x') directly at the focal plane x', the same amplitude and phase distribution will result at the magnified image plane x". The antenna system 80 of the present invention is based upon this idea.

Returning to FIG. 6, it may be seen that the Butler matrix 82 in the system 80 performs the spatial Fourier transform of the excitation sequence generated by the transmitter in block 84. It may also be seen that the Butler matrix 82 performs the spatial inverse Fourier transform, $F^{-1}[f(x'')]$, of the far field beam reflected off reflector 32 and focused onto the antenna array 40 (or 50) for reception by the feed elements 42 (or 52), and subsequent processing by the receiver in block 84.

Figure 8:
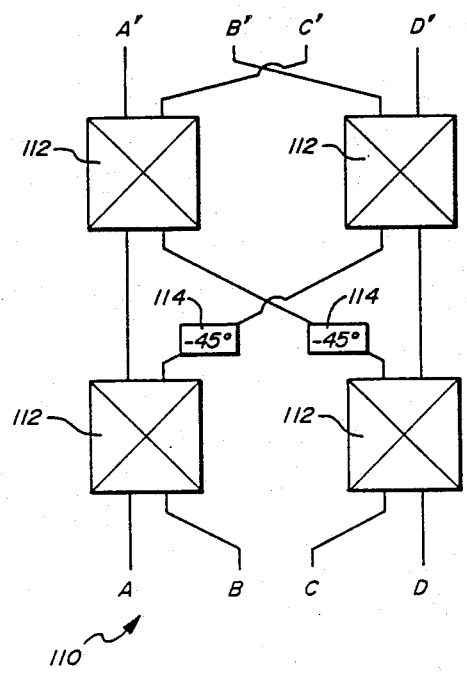
FIG. 8 is simplified electrical diagram of a four port Butler matrix usable in an antenna system of the present invention.

FIG. 8 illustrates a four port Butler matrix 110, which has a set of four inputs and a set of four outputs. The Butler matrix 110 includes four 90° phase lead hybrids 112 and two negative 45° phase shifters 114 interconnected to one another and to the two sets of four ports as shown. The four port matrix 110 is considered here for simplicity, but as those in the art know, Butler matrices can be designed with any number of desired ports. In this regard, much work has been done in developing design technique for Butler matrices, see, e.g., M. Ueno, "A Systematic Design Formulation for Butler Matrix Applied FFT Algorightm," IEEE Trans. Antennas and Propagation, Vol. AP- 29, pp. No. 3, May 1981. In the traditional use of this matrix, ports A, B, C and D would be the input ports and ports A', B', C' and D' would be the output ports and would be attached to radiator elements in an antenna system which does not use a reflector. When the antenna system 80 of the present invention is used to transmit, ports A', B', C' and D' are used as the input ports, and ports A, B, C, and D are used as the output ports. In the system 80 used as a transmitter, the ports A', B', C' and D' are fed with a set of signals that have some predetermined phase relationship from port to port that is a function of frequency. If the same signals were fed to a planar antenna array, different spot beams, each with a different beam direction, would be formed for the different frequencies. We sometimes refer to these spot beams as virtual beams, since in theory a continuum of beams exist over the entire beam width defined by the lowest frequency to highest frequency spot beams. The different phase distributions resulting from different frequencies are combined in the matrix 110 and constructively or destructively combine on different output ports. The effect is the creation of a virtual phase center in the array of signals at output ports A, B, C and D for each frequency. In other words, the phase center of an antenna array 40 (or 50) having a plurality of radiator elements 42 (or 52) with one such element attached to ports A, B, C and D will scan as a function of frequency. A particular frequency may result in a signal at one and only one port, or it may result in signals at two or more ports whose amplitude and phase corresponds to a spatial phase center somewhere between the ports.

Figure 9:
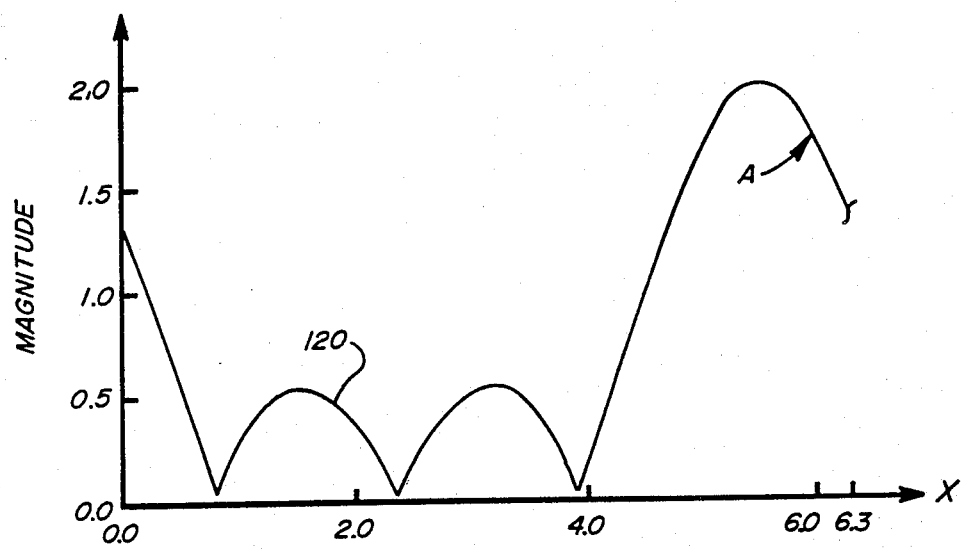
FIG. 9 is a plot, as a function of input phase, of the amplitude of the output signal of port A of the FIG. 8 Butler matrix when ports A', B', C' and D' are fed with a specified set of input signals.
Figure 10:
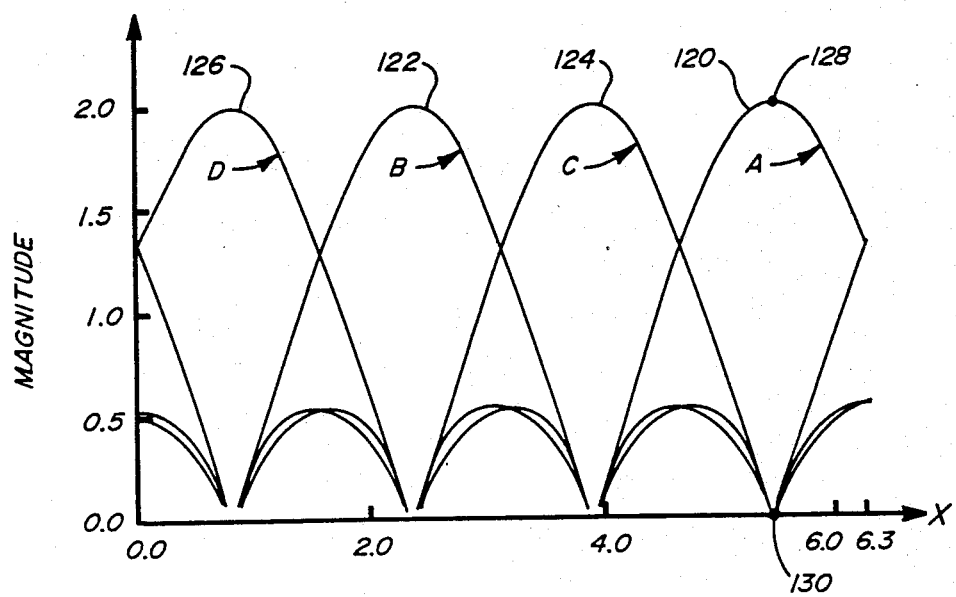
FIG. 10 is a plot, as a function of input phase, of typical amplitudes of all of the output ports in the FIG. 8 Butler matrix when the matrix is fed with a specified set of input signals.
Figure 11:
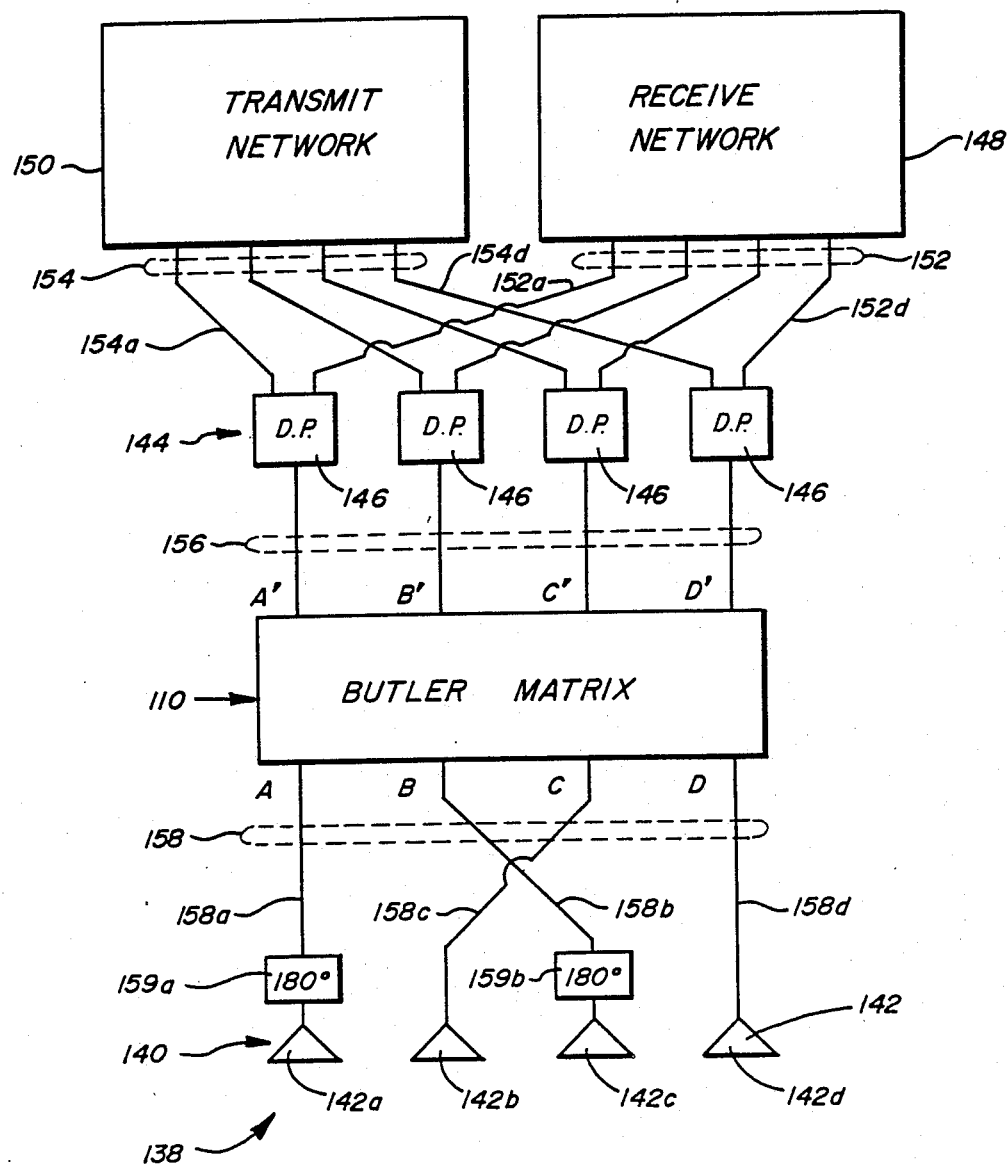
FIG. 11 is a simplified electrical block diagram showing a set of diplexers and a Butler matrix used in common by transmitter and receiver networks in an antenna system of the present invention.

Curve 120 of FIG. 9 shows the amplitude response of port A in FIG. 8 when input ports A', B', C' and D' of matrix 110 are fed with a set of input signals defined by:

$$x_n(t) = \sin(\omega t + n\Psi), \quad n = 0, 1, 2, 3 \quad (6)$$

where $\Psi$ is varied from 0 to 2 pi. (In the usual frequency scanned technique the input phase value $\Psi$ is some function of frequency and is not necessarily constant). Port A' corresponds to n=0, port B' to n=1 and so forth. Note that at a particular phase distribution a maximum signal level occurs at port A. FIG. 10 shows the magnitudes of the output signals on all ports when the matrix 110 is fed with the same type of signal sequence described above. Curves 122, 124 and 126 are the output signals of ports B, C and D, respectively. Note that each port has a maximum output value for a different relative input phase value $\Psi$. Note also that a maximum amplitude for a particular port, the outputs of the other ports are zero. For example, when curve 120 associated with port A is of its maximum at point 128, curves 122–126 are at zero amplitude at point 130. Further analysis shows that the phase center of antenna array attached to the output of the Butler matrix (as illustrated in FIG. 11) will scan the length of the arry 40 (or 50) as a function of $\Psi$. Different frequencies result in different phase centers of the antenna array.

The performances of an antenna system employing a Butler matrix is affected by the number of elements used. The more elements used the better the spatial sampling of the input and output signal sequences. Thus, it will be appreciated that a Butler matrix with relatively few ports performs a rough approximation of a Fourier transform (or inverse Fourier transform) on signals passing therethrough. As the number of ports increases, the quality and accuracy of the transformation performed increases.

FIG. 11 illustrates in greater detail how the Butler matrix 110 may be used in an antenna system 138 of the present invention, which includes transmitter and receiver subsystems. The system 138 includes an array 140 of feed elements or horns 142, which are used both as radiating elements and receiving elements. The horns 142 may be of any conventional or suitable design, such as a cup dipole one wavelength in diameter. In practice, the horns 142 function in the same basic manner as the radiating elements 42 (or 52) described earlier, and are located at or very near the focal plane or plane of an offset feed reflector 32, as in the FIG. 6 arrangement.

The system 138 also includes a group 144 of diplexers 146, and a receive network 148 and a transmit network 150 which are respectively connected to the diplexers 146 by groups 152 and 154 of electromagnetic conduits or conductors. These components may all be of conventional or suitable design. For the diplexers 164, however, we prefer to use diplexers of the type fully described in commonly assigned U.S. Pat. No. 4,427,953 to T. Hudspeth and H. Keeling entitled MICROWAVE DIPLEXER. The diplexers 146 serve to properly route incoming signals in the up-link frequency band (received by the antenna array 140, transformed by the matrix 110, and impressed upon conductors of conductor group 156) to the receive network 148. Similarly, the diplexers 146 serve to route the set of signals in the down-link frequency band (generated by the transmit network 150, impressed upon conductor group 154) to the Butler matrix 110, where they are transformed and impressed on conductor group 158 for delivery to the antenna array 140. Note that in FIG. 11 the output of ports B and C of the Butler matrix 110 are reversed in order to obtain a continuous scan of the virtual phase center with frequency. This is accomplished by having port B connected by conduit 158b to feed horn 142c, and having port C connected via conduit 158c to feed horn 142b as shown. The need to reverse the outputs of the beam ports B and C is clear when one observes that in FIG. 10 the curves 122 and 124 representing for the output signals of ports B and C are reversed with respect to the ordering of the output signals of ports A and D, from high to low values of input phase $\Psi$. The two 180° phase shifters 159a and 159b correct for phase reversals in the output signals of ports A and B, which occur on account of the operation of the Butler matrix 110.

Figure 12:
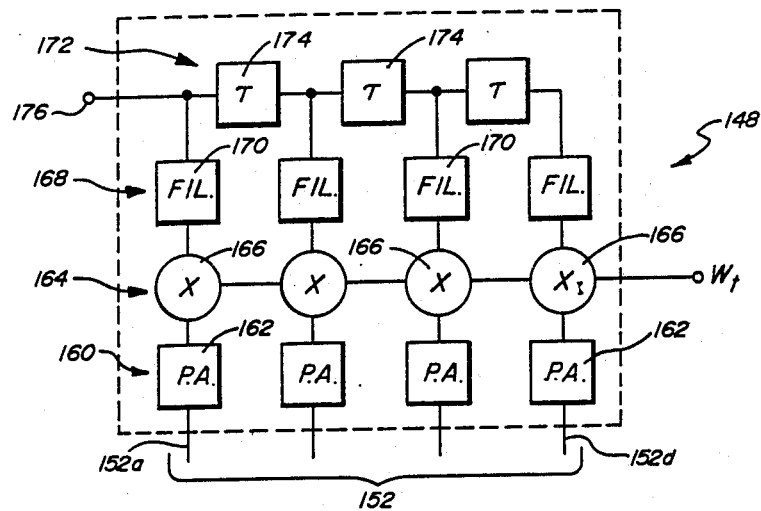
FIG. 12 is an electrical diagram of one embodiment of a receive network of the present invention which introduces port-to-port phase differences into a received set of signals through the use of progressive time delays or frequency dependent phase shifts.

FIG. 12 is a block diagram for one possible embodiment for, which shows the various components and signal paths the receive network 148 of antenna system 138 in FIG. 11. The network 148 includes: a group 160 of preamplifiers 162 for boosting the level of the received signals delivered by conduits 152; a group 164 of frequency translators 166 for reducing the carrier frequency of received signals from preamplifiers 162 to a intermediate or baseband frequency range; a group 168 of four bandpass filters 170 for rejecting side lobes or other frequency translation products outside of the desired frequency range; and a group 172 of three shift-producing components or elements 174, all connected together as shown to produce a baseband signal on output terminal or port 176. The shift producing elements 174 may either be time delay elements or frequency dependent phase shifters. The receiver network 148 is turned to the frequency bands of the respective up-link communication channels, thereby permitting simultaneous reception of signals from a plurality of ground stations.

Figure 13:
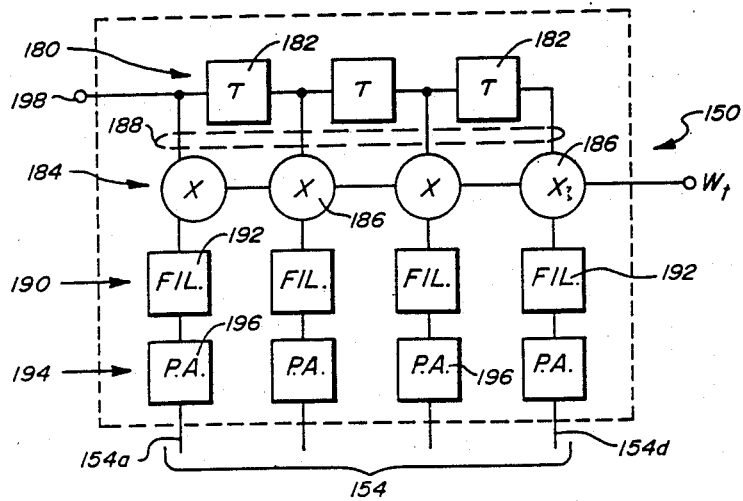
FIG. 13 is an electrical block diagram of one embodiment of a transmit network of the present invention having functional similarities to the receive network shown in FIG. 12.

FIG. 13 is a block diagram of the transmit network 150 shown in FIG. 11. The network 150 includes: a group 180 of shift-producing components or elements 182; a group 184 of four frequency shifters 186 for increasing the carrier frequency of signals imposed on group of conduits 188 to a higher frequency range, a group 190 of band pass filters 192 for removing unwanted signals outside of the desired frequency range generated by the operation frequency translators 186; and a group 194 of power amplifiers 196 to boost the power of the signals impressed on conductor group 154. In the transmit network 150, the signal to be transmitted is imposed upon input terminal or port 198.

FIGS. 12 and 13 also illustrate one possible method for producing the port-to-port input phase value $\Psi$ as a function of frequency through the introduction of time delays or frequency dependent phase shifts. These are introduced through the shift-procuding elements 174 in FIG. 12, and the shift-producing elements 182 in FIG. 13. In FIG. 13, the time delays or phase shifts are introduced at baseband (or some intermediate frequency), and then each signal in the resultant signal set is imposed on a conduit of conduit group 188 in order to be frequency translated in parallel by frequency translators 186 up to the desired frequency range. This is done so that a particular bandwidth will produce the desired range of phase distributions in the signal set applied to the Butler matrix 110 through conductor group 154, and therefore result in the scanning of the phase center of the array across to the desired range. This method can be advantageously applied, for example, in the MSAT system discussed in the background portion of the specification.

The MSAT system satellite discussed above will transmit in the UHF band at 866 to 870 MHz. The change in phase of a sinusoid due to a time delay such as those in FIGS. 12 and 13 can be calculated by the following formula where input phase value is expressed in radians:

$$\Delta \Psi = n 2 \pi f \tau \qquad (7).$$

In order to produce a sufficiently large beam scan angle when using the Butler matrix 110 shown in FIG. 8, a fairly wide range of phase distributions is required.

One approach for determining what time delays or phase shifts are required to operate the system 138 of FIG. 11 in the desired manner is to choose the optimum range of phase distributions and find a frequency at which the bandwidth in question will produce this range using a time delay or phase shifting device. For example the Butler matrix 110 shown in FIG. 8 will provide the best scanning of the phase center of the antenna array if the input phase distributions range between $\pi/4$ and $7\pi/4$ radians. For simplicity assume a time delay will be used. Hence setting the conditions $$\pi/4 = 2\pi f_1 \tau \tag{8}$$

and $$7\pi/4 = 2\pi f_2 \tau \tag{9}$$

then $$\tau = 7\pi/8\,\pi f_2 = \pi/8\,\pi f_1 \tag{10}$$

or $$f_2/f_1 = 7 \tag{11}$$

combining this relationship with the idea that $$f_2 - f_1 = 4 \text{ MHz} \tag{12}$$

i.e., the bandwidth of down-link transmissions in the MSAT satellite, we can find that $f_1 = 666.7 \times 10^3$ Hz and $f_2 = 4.6667 \times 10^6$ Hz. Working at this intermediate frequency range we can now find a time delay that will produce the desired range of phase distributions, namely $\tau = 1/(8f_1) = 187.5 \times 10^{-9}$ seconds.

Working with this time delay at this intermediate frequency band allows the bandwidth of the signal to produce the desired port to port frequency dependent phase relationships. Each signal in the set can then be frequency translated up to the desired frequency range (in parallel) without changing the port to port phase relationship introduced by the time delays at the intermediate frequency band.

Figure 14:
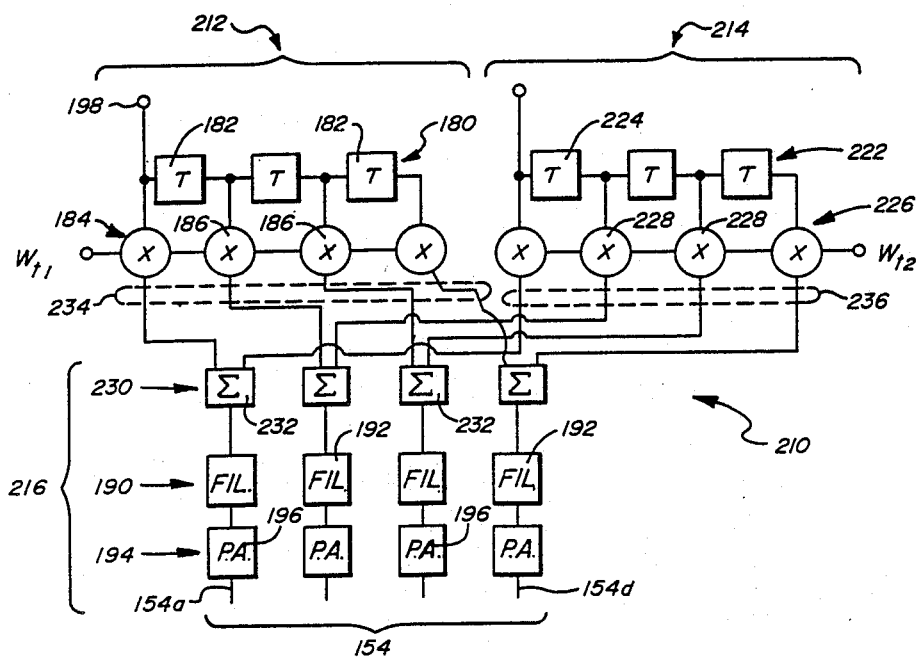
FIG. 14 is an electrical block diagram of a dual frequency dual signal transmit network of the present invention for simultaneously summing and preparing for transmission a plurality of distinct frequency signals.

By using different time delays and different intermediate frequencies the signals from different transmitters (or to different receivers) may be combined to use the same Butler matrix and produce the same type of antenna patterns even if the transmitters are operating at different frequencies and have different bandwidths. Using the technique described above, different signals with different bandwidths may be used to produce a set of input signals with the same range of phase distributions. Applying the combination of these sets to the Butler matrix feeding an antenna array allows both signal bandwidths to produce the same frequency scanned virtual beam patterns. This concept is illustrated in FIG. 14, which shows a dual frequency transmit network 210 capable of generating two sets of output signals at different frequency bands. The network 210 may be used in place of transmit network 150 in the antenna system 138 shown in FIG. 11.

The network 210 includes a first frequency network portion 212, a second frequency network portion 214, and a common network portion 216. Network portion 212 is comprised of a group 180 of three shift-producing devices 182 and a group 184 of frequency translators 186, which operate as previously explained in FIG. 13. Network portion 214 includes a group 222 of shift-producing devices 224 and a group 226 of frequency translating devices 228 for producing a set of signals at a different frequency band from those produced by network portion 212. The shift-producing devices 182 and 224 may be time delay units or frequency dependent phase shift units. Network portion 216 includes: a group 230 of sum-producing elements or mixers 232 (which combine the two different sets of signals from network portions 212 and 214 delivered to the mixers 232 via conductor groups 234 and 236, respectively); a group 190 of band pass filters 192; and a group 194 of power amplifiers 196. The various components of network 210 are connected as shown in FIG. 14 and result in the production of two sets of signals having different frequency bands which are combined, amplified and then simultaneously impressed upon conductor group 154 for delivery to the remainder of the system 138 shown in FIG. 11.

The shift-producing units or devices 174, 182 and 224 may be conveniently fabricated of lumped parameter all-pass networks employing well-known circuitry. These units or devices are located ahead of the transmitting power amplifiers 184 and 196 in FIGS. 13 and 14 so as to operate at relatively low power and thereby minimize power loss.

The foregoing embodiments of the present invention have been described with respect to a mobile satellite communication systems for transmitting and receiving between multiple ground stations at certain specified frequencies in the L band. Those in the art will appreciate that the present invention may be readily adapted to be used in land or satellite communication systems operated in other frequency bands, such as the C or Ku bands, for example. The size of the main reflector, the arrangement and type of antenna arrays, and th specific receive and transmit networks utilized in the present invention may vary substantially without departing from the fair scope of the broader aspects of the present invention. For example, separate feed horns may be used to transmit and receive electromagnete radiation constituting the steerable beam. Also, a conventional screen-type diplexer may be placed between the antenna array and reflector so as to divert the incoming electromagnetic radiation to be received to a separate receiver array arranged at a substantial angle to the plane of first antenna array. Such an embodiment would thus have separate transmit and receive antenna arrays. Alternatively, two separate main reflectors could be provided, one to be used with a separate transmit antenna array, and the other to be used with a separate receive antenna array. We presently do not favor this latter arrangement for satellite antenna systems of the present invention, on account of the appreciable extra weight and cost of providing two main reflectors. However, such an embodiment may be quite suitable for systems of the present invention constructed on land or on sea-going vessels.

In view of the foregoing description, it is seen that the antenna system of the present invention is well-suited for two-way communications between ground stations and a geosynchronous satellite. The antenna system of the present invention has the advantages of effectively combining the power of the output signals of a plurality of power amplifiers simultaneously operated in parallel. It also provides a single reflector antenna system which, through the use of a spatial transformation means such as a Butler matrix, is functionally equivalent to the dual confocal reflector system described in the background portion of the specification, including achieving a magnification of the effective aperture of the elements. The antenna system of the present invention eliminates the need for the use of a subreflector without providing aditional radiating elements, thus saving weight, space and cost, since the antenna system of the present invention uses a scannable virtual beam technique, it also reduces the physical size of the antenna system by minimizing the number of radiating elements and reflectors which must be used. Thus, an antenna system of the present invention results in a lighter weight, more efficient satellite communication systems. Finally, the use of time delays or phase shifts at baseband or intermediate frequencies allows the output of multiple transmit networks to be applied to a single array of radiating elements to produce the same antenna pattern at different frequencies, thus enabling the antenna system to be used in satellite communication systems requiring a multiple, two-way, simultaneous communication channels between many widely separated ground stations within the scanning angle of the virtual beams.

It is to be understood that the above-described embodiments of the present invention are illustrative only, and that modifications thereof may occur to those skilled in the art. Accordingly, the present invention is not to be regarded as limited to the embodiments or methods disclosed herein, but is to be limited only as defined by the appended claims.

We claim:
1. A method of operating a frequency addressable, steerable beam antenna system, comprising the steps of:
    (a) providing a set of first signals having a predetermined phase relationship with respect to one another and containing information to be transmitted, each of said first signals having a carrier frequency related to its corresponding phase;
    (b) generating a set of second signals from said set of first signals by at least approximately performing a spatial transformation on the amplitude and distribution of said set of first signals, including the step of feeding said first set of signals to the inputs of a Butler matrix such that the phase of the first signals varies from input-to-input of said matrix in a predetermined relationship, said Butler matrix including a plurality of outputs for delivering said second set of signals, the phase distribution of said second set of signals at said outputs being determined by the predetermined relationship of the phases of said first signals;
    (c) feeding said second set of signals from the outputs of said Butler matrix to a plurality of feed elements of an antenna array in a manner such that the phases of the second set of signals vary from feed element to feed element in accordance with said predetermined phase relationship; and
    (d) transmitting said set of second signals toward a reflector from said antenna array at a position located near a focal point of the reflector in a manner to from a plurality of beams of electromagnetic radiation where each of said beams is associated with a particular one of said carrier frequencies.

2. A method as in claim 1 wherein said reflector is mounted on a satellite and is a main reflector.

3. A method as in claim 1, wherein said spatial transformation is a Fourier transform.

4. A method as in claim 1, wherein the predetermined phase relationship of said set of first signals is at least substantially defined by:

$$x_n(t) = \sin(\omega t + n\Psi), \quad n = 0, 1, 2, 3$$

where n identifies the relative position of each first signal within the set of first signals, $\Psi$ is the input phase value, and $\omega$ is the frequency.

5. A method as in claim 4, wherein the input phase value is held constant.

6. A method as in claim 4, wherein the input phase value varies as a function of frequency.

7. A method as in claim 1, wherein step (a) includes the substeps of:
    (1) providing a baseband signal; and
    (2) introducing a plurality of time delays into said baseband signal to generate at least a plurality of said first signals.

8. A method as in claim 1, wherein step (a) includes the substeps of:
    (1) providing a baseband signal; and
    (2) applying said baseband signal to a plurality of frequency dependent phase shifters to generate at least a plurality of said first signals.

9. A method as in claim 1, further comprising the step of:
    (d) frequency translating the set of first signals to a first higher frequency range in parallel before generating said set of second signals.

10. A method as in claim 9 further comprising the steps of:
    (e) providing a set of third signals having a predetermined phase relationship with respect to one another;
    (f) generating a set of fourth signals from said set of third signals by at least approximately performing a spatial transformation on the amplitude and distribution of said set of third signals;
    (g) transmitting said set of fourth signals toward said reflector by passing said fourth signals through the same plurality of radiating elements the second signals are passed through; and
    (h) frequency translating the set of third signals to a second higher frequency range in parallel before generating said set of fourth signals, said second frequency range being different from said first frequency range.

11. A method as in claim 10, further comprising the step of:
    providing a common Butler matrix in said antenna system for generating simultaneously said sets of second and fourth signals from said sets of first and third signals respectively.

12. An antenna system for producing a set of frequency addressable beams of electromagnetic radiation, comprising:
    a reflector for reflecting electromagnetic radition and having a focal point associated therewith;
    a frequency selective beam former for forming a plurality of beams of electromagnetic radiation using a plurality of respectively associated beam forming signals, said beam forming signals being shifted in phase relative to each other and possessing carrier frequencies which are a function of the phase shift between said signals;
    transformation means coupled with said beam former and positioned essentially at said focal point of said reflector for essentially performing a spatial transformation on the amplitude and phase distribution of said beam forming signals, said transformation means including a plurality of inputs for receiving said beam forming signals, the phase distribution of said signals being in a predetermined relationship among said inputs, and a plurality of outputs for delivering the transformer beam forming signals, the phase distribution of said signals delivered at said outputs being determined by said preselected relationship of the phase distribution of said signals at said inputs; and an antenna array having a plurality of feed elements coupled with said outputs of said transformation means so as to receive the beam forming signals as a function of the phase distribution of said signals, said antenna array being positioned so as to direct electromagnetic energy toward said reflector, the electromagnetic energy received by said reflector from said antenna array being reflected to form a plurality of beams of electromagnetic energy where each of said beams is associated with a particular one of said frequencies and emanates from one of said feed elements which receives a beam forming signal having a phase corresponding to the particular frequency.

13. A system as in claim 12, wherein said spatial transformation is a Fourier transform.

14. A system as in claim 12, wherein said feed elements are feed horns arranged in a hexagonal pattern.

15. A system as in claim 12, wherein said transformation means is a Butler matrix.

16. A system as in claim 12, wherein said predetermined phase relationship is defined by the formula:

$$X_n = \sin(\omega t + n\Psi), n = 0, 1, 2, 3$$

where n identifies the relative position of each signal within said set of signals, $\Psi$ is an input phase value in the range from 0 to 2 pi, and $\omega$ is the frequency of the signal.

17. A system as in claim 12, wherein said beam former includes a plurality of signal paths, with one such path being associated with each signal generated thereby, and wherein each such signal path includes an amplifier.

18. A system as in claim 17, wherein each such signal path also includes a bandpass filter arranged in series with said amplifier.

19. A system as in claim 17, wherein said beam former includes:

first means for generating, from a first signal having a first nominal frequency, a first set of second signals shifted in phse from one another for delivery to said transformation means in order to enable said system to produce a frequency scanning virtual beam containing information encoded in said first signal.

20. A system as in claim 19, wherein said first means for generating includes a plurality of shift-producing elements, each being capable of effectively phase-shifting a signal passed therethrough and each being associated with one of said second signals.

21. A system as in claim 19, wherein said shift-producing element is a time delay device.

22. A system as in claim 19, wherein said first means for generating includes a plurality of band pass filters and modulating amplifiers, and wherein each shift-producing element is operatively connected to a signal path formed at least in part by one such band pass filter and one such modulating amplifier arranged in series between said shift-producing element and one of the inputs of said transformation means.

23. A system as in claim 19, wherein said beam former further includes:

second means for generating, from a third signal having a second nominal frequency different from said first nominal frequency, a second set of second signals for delivery to said transformation means in order to transmit as part of said frequency scanning virtual beam, information encoded in said third signal.

24. A system as in claim 23, further comprising:

means for summing said first and second sets of second signals before said signals are delivered to said transformation means.

25. A system as in claim 24, wherein said summing means includes a plurality of sum-producing elements, and said first means for generating and said second means for generating each include and share a plurality of band pass filters and modulating amplifiers, and wherein each sum-producing element is operatively connected to a signal path formed at least in part by one such band pass filter and one such modulating amplifier arranged in series between said sum-producing element and one of the input ports of said transformation means.

26. A system as in claim 23, wherein said first generating means and said second generating means each include a plurality of frequency translation means for modulating the set of second signals associated therewith at a predetermined frequency before said second signals are delivered to respective ones of said sum-producing elements.

27. A system as in claim 19 wherein said first means for generating includes a plurality of frequency translation means for modulating the set of second signals at a predetermined frequency before said second signals are delivered to said transformation means.

28. A system as in claim 11, including the step of separately amplifying groups of the first set of signals provided in step (a) before said first set of signals is fed to said Butler matrix in step (b).

29. A system as in claim 12, including a plurality of amplification means coupled between said beam former and said transformation means, for respectively amplifying groups of said beam forming signals, and wherein said transformtion means is operative to combine the power of the amplified beam forming signals in accordance with the frequencies of said amplified beam forming signals.

* * * * *